(12) United States Patent
Ichikawa et al.

(10) Patent No.: US 9,694,558 B2
(45) Date of Patent: Jul. 4, 2017

(54) MULTILAYER NONWOVEN FABRIC FOR FOAM MOLDING, METHOD OF PRODUCING MULTILAYER NONWOVEN FABRIC FOR FOAM MOLDING, URETHANE-FOAM MOLDED COMPLEX USING MULTILAYER NONWOVEN FABRIC, VEHICLE SEAT, AND CHAIR

(71) Applicant: MITSUI CHEMICALS, INC., Minato-ku, Tokyo (JP)

(72) Inventors: Taro Ichikawa, Sodegaura (JP); Norihito Saza, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/916,436

(22) PCT Filed: Sep. 5, 2014

(86) PCT No.: PCT/JP2014/073583
§ 371 (c)(1),
(2) Date: Mar. 3, 2016

(87) PCT Pub. No.: WO2015/034069
PCT Pub. Date: Mar. 12, 2015

(65) Prior Publication Data
US 2016/0207279 A1 Jul. 21, 2016

(30) Foreign Application Priority Data
Sep. 6, 2013 (JP) ................................. 2013-185735

(51) Int. Cl.
| | | |
|---|---|---|
| B32B 5/06 | (2006.01) |
| D04H 1/46 | (2012.01) |
| D04H 1/4382 | (2012.01) |
| D04H 1/541 | (2012.01) |
| B32B 5/26 | (2006.01) |
| B32B 5/08 | (2006.01) |
| A47C 27/14 | (2006.01) |
| A47C 7/00 | (2006.01) |
| D04H 1/498 | (2012.01) |
| B32B 5/02 | (2006.01) |
| B32B 7/08 | (2006.01) |
| B32B 5/18 | (2006.01) |
| B60N 2/64 | (2006.01) |

(52) U.S. Cl.
CPC .................. *B32B 5/26* (2013.01); *A47C 7/00* (2013.01); *A47C 27/14* (2013.01); *B32B 5/022* (2013.01); *B32B 5/06* (2013.01); *B32B 5/08* (2013.01); *B32B 5/18* (2013.01); *B32B 7/08* (2013.01); *B60N 2/64* (2013.01); *D04H 1/4382* (2013.01); *D04H 1/498* (2013.01); *D04H 1/541* (2013.01); *B32B 2260/046* (2013.01); *B32B 2262/0253* (2013.01); *B32B 2262/0276* (2013.01); *B32B 2266/0278* (2013.01); *B32B 2307/724* (2013.01); *B32B 2479/00* (2013.01); *B32B 2605/00* (2013.01); *B32B 2605/003* (2013.01)

(58) Field of Classification Search
CPC ........ D04H 1/4382; D04H 1/46; D04H 1/498; D04H 1/541; B32B 5/022; B32B 5/06; B32B 5/26
USPC ................ 442/381, 387, 388, 400, 401, 361
See application file for complete search history.

(56) References Cited

U.S. PATENT DOCUMENTS

| | | | | |
|---|---|---|---|---|
| 7,709,405 | B2 * | 5/2010 | Wenstrup ................ B32B 5/022 | |
| | | | | 428/212 |
| 2012/0119558 | A1 | 5/2012 | Ichikawa et al. | |

FOREIGN PATENT DOCUMENTS

| | | |
|---|---|---|
| JP | 62-26193 Y2 | 7/1987 |
| JP | 2-258332 A | 10/1990 |
| JP | 6-136651 A | 5/1994 |
| JP | 8-142245 A | 6/1996 |
| JP | 2004-353153 A | 12/2004 |
| JP | 2005-212204 A | 8/2005 |
| JP | 2005-288873 A | 10/2005 |
| JP | 2006-281768 A | 10/2006 |
| JP | 2007-146356 A | 6/2007 |
| JP | 2011-052332 A | 3/2011 |
| JP | 2012-082548 A | 4/2012 |

(Continued)

OTHER PUBLICATIONS

International Search Report (PCT/ISA/210) issued on Oct. 28, 2014, by the Japanese Patent Office as the International Searching Authority for International Application No. PCT/JP2014/073583.

(Continued)

*Primary Examiner* — Jenna Johnson
(74) *Attorney, Agent, or Firm* — Buchanan, Ingersoll & Rooney PC

(57) ABSTRACT

Disclosed is a multilayer nonwoven fabric for foam molding containing a dense layer and a reinforcing layer provided on at least one side of the dense layer, the reinforcing layer is a staple fiber nonwoven fabric containing thermoplastic resin staple fibers (A) having a fiber diameter of more than 20 μm, in an amount of 5% by mass to 50% by mass, and hermoplastic resin staple fibers (B) having a fiber diameter of 20 μm or less, in an amount of 95% by mass to 50% by mass, and conjugate polyester-based staple fibers (C) are contained in an amount of 10% by mass to 40% by mass, the dense layer is a nonwoven fabric having bulk density in a range of from 0.05 g/cm$^3$ to 0.3 g/cm$^3$, and the dense layer and the reinforcing layer are entangled with each other by needle punching.

25 Claims, No Drawings

(56) References Cited

FOREIGN PATENT DOCUMENTS

| | | |
|---|---|---|
| JP | 2012-131032 A | 7/2012 |
| JP | 2013-129950 A | 7/2013 |
| WO | WO 2012/008169 A1 | 1/2012 |

OTHER PUBLICATIONS

Written Opinion (PCT/ISA/237) issued on Oct. 28, 2014, by the Japanese Patent Office as the International Searching Authority for International Application No. PCT/JP2014/073583.

* cited by examiner

MULTILAYER NONWOVEN FABRIC FOR FOAM MOLDING, METHOD OF PRODUCING MULTILAYER NONWOVEN FABRIC FOR FOAM MOLDING, URETHANE-FOAM MOLDED COMPLEX USING MULTILAYER NONWOVEN FABRIC, VEHICLE SEAT, AND CHAIR

TECHNICAL FIELD

The present invention relates to a multilayer nonwoven fabric for foam molding arranged in a bottom portion of a foam molded article such as polyurethane, a method of producing a multilayer nonwoven fabric for foam molding, a urethane-foam molded complex using the multilayer nonwoven fabric, a vehicle seat, and a chair.

BACKGROUND ART

Foam molded articles such as flexible polyurethane foams are used as a cushioning material for a product such as a vehicle seat. At the bottom portion of the foam molded articles, a reinforcing base fabric is arranged in order to enhance the rigidity of the urethane foam molded article as well as to prevent the leakage of urethane to the back side of the article. Examples of the reinforcing base fabric include a combination of a cheesecloth (victoria lawn) and slab urethane, and a coarse blanket. However, such reinforcing base fabrics are insufficient in improving the rigidity of the urethane foam molded articles, or insufficient for preventing the leakage of urethane to the back side, which are of a problem.

As a method of improving the above defects, there have been proposed various methods such as a method using, as a reinforcing base fabric, a nonwoven fabric in which a thin dense layer having a basis weight of 10 g/m² to 30 g/m² and a coarse bulky layer having a basis weight of 40 g/m² to 100 g/m² are integrated with each other (see, for example, Japanese Utility Model Application Publication (JP-Y) No. S62-26193), a method using a high basis weight nonwoven fabric having a basis weight of 110 g/m² to 800 g/m² and a fiber diameter of 1 d to 16 d (see, for example, Japanese Patent Application Laid-Open (JP-A) No. H2-258332), a method using a mehblown nonwoven fabric havinQ a fiber diameter of 10 μm or less as a dense layer (see, for example, JP-A No. 2004-353153), a method using a nonwoven fabric in which a web (a dense layer) formed of fibers having a fineness of 1.1 dtex to 2.7 dtex and a web (a bulky layer) formed of fibers having a fineness of 2.3 dtex to 8.8 dtex are provided by mechanically entangling (see, for example, JP-A No. 2007-146356), and a method using, as a reinforcing material for a foam molded article, a multilayer obtained by integrating a fibrous substrate layer such as a spunbonded nonwoven fabric and a staple fiber layer, provided on at least one side of the fibrous substrate layer, through the action of high-pressure water flow (see, for example, JP-A No. 2005-212204).

However, the reinforcing base fabrics for foam molding described in the above documents are all directed to solving problematic leakage during urethane foam formation and impregnation performance, and they are not materials which can reduce troublesome manual labor, such as cutting and sewing, before foam molding.

As vehicle seats become more advanced in design and involve more electronic components in recent years, the shapes of metal molds during urethane foam formation have become complicated. The need to conform to such complicated shapes causes a significant increase in labor in manually cutting and sewing the reinforcing base fabrics. As a method of saving the labor, there has been proposed a molding processing method in which a mold is covered with a nonwoven fabric sheet, and the nonwoven fabric sheet is then heated, spread, and compressed to conform to the shape of the mold, whereby processing before foam formation is easily performed. As an example of the reinforcing base fabrics used in this molding processing method, a nonwoven fabric sheet including a mixture of low-melting-point fibers and high-melting-point fibers is exemplified (see, for example, JP-A No. 2006-281768) Further, it has been proposed that a nonwoven fabric mainly composed of conjugate staple fibers including high and low melting components of polyester resin is used as an urethane reinforcing material to eliminate the need of cutting as well as to prevent the leakage of urethane during molding in the molding processing of urethane foams (see, for example, JP-A Nos. 2012-82548 and 2013-129950).

Further, there has been proposed to provide a dense layer to secure denseness (for example, JP-A No. 2013-129950). Furthermore, there has been proposed a multilayer nonwoven fabric for foam formation in which a reinforcing layer is provided on at least one side of a dense layer, and the dense layer is formed by providing a spunbonded nonwoven fabric layer on both sides of a meltblown nonwoven fabric layer and the meltblown nonwoven fabric layer and the spunbonded nonwoven fabric layer are partially thermocompression-bonded with each other (see, for example, WO 2012/008169). It is described that this multilayer nonwoven fabrics for foam formation have excellent resistance to the separation of layers, and even when the multilayer is provided (entangled) using a needle punch, surface powdering caused by fiber waste of the meltblown nonwoven fabric layer is reduced.

SUMMARY OF INVENTION

Technical Problem

In the nonwoven fabrics obtained by the techniques diselosed in the above JP-A Nos. 2006-281768, 2012-82548, and 2013-129950, conformity to the shape of a mold is improved, and the labor in sewing can be reduced. However, there is a problem that since a nonwoven fabric formed of staple fibers is excessively stretched while following the shape of a mold, an extremely thin portion with insufficient denseness is formed. In the nonwoven fabric obtained by the technique disclosed in JP-A No. 2013-129950, there is a problem that the thickness of the nonwoven fabric is extremely reduced by thermal compression in the thickness direction while the nonwoven fabric follows to the shape of a mold. In any case, when urethane foaming as a subsequent process is performed, urethane leaks to the back side through such a thin portion to possibly cause problems such as low reinforcing effects, the occurrence of unusual noises between the urethane and metal springs, and low comfortableness of chairs and the like, using those nonwoven fabrics. In the technique disclosed in WO 2012/008169, although the denseness is satisfactorily maintained even if the multilayer nonwoven fabric is stretched while following the shape of a mold, a thin portion is formed by compression in the thickness direction, and urethane may leak during urethane foaming. Namely, there has not been obtained a flexible material whose denseness is satisfactorily maintained even if the material is stretched while being heated, spread, and compressed to conform to the shape of a mold and in which reduction in thickness is prevented even if the material is subjected to thermal compression in the thickness direction.

An object of the invention is to provide a multilayer nonwoven fabric for foam molding, which exhibits an excellent conformity to the shape of a mold during molding processing involving heating, spreading, and compressing and satisfactorily maintains denseness even if being stretched, in which reduction in thickness is prevented even if the multilayer nonwoven fabric is subjected to thermal compression in the thickness direction, and which exhibits an excellent balance of reinforcing effects, performance of preventing urethane leakage noise prevention performance), and flexibility of a nonwoven fabric layer (comfortableness of chairs and the like using the multilayer nonwoven fabric) after being shaped to the mold, a urethane-foam molded complex using the multilayer nonwoven fabric, a vehicle seat and a chair using the multilayer nonwoven fabric, and a method of producing a multilayer nonwoven fabric for foam molding.

Solution to Problem

The means for solving the above problems are as follows.

<1> A multilayer nonwoven fabric for foam molding, containing:
  a dense layer; and
  a reinforcing layer provided on at least one side of the dense layer, wherein the reinforcing layer is a staple fiber nonwoven fabric containing:
    thermoplastic resin staple fibers (A) having a fiber diameter of more than 20 μm, in an amount of 5% by mass to 50% by mass, and
    thermoplastic resin staple fibers (B) having a fiber diameter of 20 μm or less, in an amount of 95% by mass to 50% by mass,
  wherein a total of the thermoplastic resin staple fibers (A) and the thermoplastic resin staple fibers (B) is 100% by mass, the thermoplastic resin staple fibers (A) or the thermoplastic resin staple fibers (B) contain conjugate polyester-based staple fibers (C) formed containing two or more resins having different melting points, and the conjugate polyester-based staple fibers (C) are contained in the reinforcing layer in an amount of 10% by mass to 40% by mass,
  wherein the dense layer is a nonwoven fabric having bulkdensity in a range of from 0.05 g/cm$^3$ to 0.3 g/cm$^3$, and
  wherein the dense layer and the reinforcing layer are entangled with each other by needle punching.

<2> The multilayer nonwoven fabric for foam molding according to <1>, wherein a thickness of the fabric is from 1.6 mm to 5.0 mm.

<3> The multilayer nonwoven fabric for foam molding according to <1> or <2>, wherein a thickness of the fabric after being held at 110° C. and 4.9 Pa for 5 minutes is 1.2 mm or more.

<4> The multilayer nonwoven fabric for foam molding according to any one of <1> to <3>, wherein a fiber diameter of at least a portion of the conjugate polyester-based staple fibers (C) is 20 μm or less.

<5> The multilayer nonwoven fabric for foam molding according to any one of <1> to <4>, wherein a melting point of at least one resin that forms the conjugate polyester-based staple fibers (C) is in a range of from 110° C. to 190° C.

<6> The multilayer nonwoven fabric for foam molding according to any one of <1> to <5>, wherein the dense layer includes a nonwoven fabric that is partially thermocompression-bonded, air through processed, resin bonded, or calendered.

<7> The multilayer nonwoven fabric for foam molding according to any one of <1> to <6>, wherein the dense layer is a nonwoven fabric constituted of continuous fibers.

<8> The multilayer nonwoven fabric for foam molding according to any one of <1> to <7>, wherein the thermoplastic resin staple fibers (A) and the thermoplastic resin staple fibers (B) are at least one kind of staple fibers selected from the group consisting of polyester-based staple fibers and polyolefin-based staple fibers.

<9> The multilayer nonwoven fabric for foam molding according to any one of <1> to <8>, wherein the thermoplastic resin staple fibers (A) and the thermoplastic resin staple fibers (B) are polyester-based staple fibers.

<10> The multilayer nonwoven fabric for foam molding according to any one of <1> to <9>, wherein the dense layer includes a continuous fiber nonwoven fabric that is partially thermocompression-bonded.

<11> The multilayer nonwoven fabric for foam molding according to any one of <1> to <10>, wherein a basis weight of the dense layer is in a range of from 10 g/m$^2$ to 35 g/m$^2$.

<12> The multilayer nonwoven fabric for foam molding according to any one of <1> to <11>, wherein an air permeability of the dense layer is in a range of from 70 cm$^3$/cm$^2$/sec to 200 cm$^3$/cm$^2$/sec.

<13> The multilayer nonwoven fabric for foam molding according to any one of to <12>, wherein the dense layer comprises a multilayer structure containing:
  a melt-blown nonwoven fabric layer (M) that is constituted of continuous fibers, and
  a spunbonded nonwoven fabric layer (S) constituted of continuous fibers, and provided on both sides of the melt-blown nonwoven fabric layer (M); and
  the melt-blown nonwoven fabric layer (M) and each spunbonded nonwoven fabric layer (S) are partially thermocompression-bonded with each other.

<14> The multilayer nonwoven fabric for foam molding according to any one of <1> to <13>, wherein the multilayer nonwoven fabric has an air permeability at a pressure difference of 125 Pa of from 25 cm$^3$/cm$^2$/sec to 160 cm$^3$/cm$^2$/sec.

<15> The multilayer nonwoven fabric for foam molding according to any one of <1> to <14>, wherein the multilayer nonwoven fabric has a basis weight of from 20 g/m$^2$ to 160 g/m$^2$.

<16> The multilayer nonwoven fabric for foam molding according to any one of <1> to <15>, wherein the multilayer nonwoven fabric has an air permeability at a pressure difference of 125 Pa of 25 cm$^3$/cm$^2$/sec to 140 cm$^3$)cm$^2$/cm$^2$/sec.

<17> The multilayer nonwoven fabric for foam molding according to any one of <1> to <16>, wherein a basis weight of the reinforcing layer is in a range of from 40 g/m$^2$ to 150 g/m$^2$.

<18> A method of producing the multilayer nonwoven fabric for foam molding according to any one of <1> to <17>, containing providing the reinforcing layer on at least one side of the dense layer, and, subsequently, entangling thenforcing layer and the dense layer with each other by needle punching.

<19> The method of producing the multilayer nonwoven fabric for foam molding according to <18>, wherein the dense layer is formed by providing the spunbonded nonwoven fabric layer (S) on both sides of the meltblown nonwoven fabric layer (M), and, subsequently, carrying out partial thermocompression-bonding, air through processing, resin bonding, or calendering.

<20> A urethane-foam molded complex in which a urethane foam layer is provided on an outer surface of the reinforcing layer of the multilayer nonwoven fabric for foam molding according to any one of <1> to <17>.

<21> The urethane-foam molded complex according to <20>, wherein the reinforcing layer and the urethane foam layer are integrated with each other.

<22> A vehicle seat including the multilayer nonwoven fabric for foam molding according to any one of <1> to <17> or the urethane-foam molded complex according to <20> or <21>.

<23> A chair including the multilayer nonwoven fabric for foam molding according to any one of <1> to <17> or the urethane-foam molded complex according to <20> or <21>.

Advantageous Effects of Invention

The present invention can provide a multilayer nonwoven fabric for foam molding, which exhibits an excellent conformity to the shape of a mold during molding processing involving heating, spreading, and compressing and satisfactorily maintains denseness even if being stretched, in Which reduction in thickness is prevented even if the multilayer nonwoven fabric is subjected to thermal compression in the thickness direction, and which exhibits an excellent balance of reinforcing effects, performance of preventing urethane leakage (noise prevention performance), and flexibility of a nonwoven fabric layer (comfortableness of chairs and the like using the multilayer nonwoven fabric) after being shaped to the mold, an urethane-foam molded complex using the multilayer nonwoven fabric, a vehicle seat and a chair using the multilayer nonwoven fabric, and a method of producing a multilayer nonwoven fabric for foam raiding.

DESCRIPTION OF EMBODIMENTS

In this specification, numerical ranges depicted with "from" and "to" represent ranges inclusive of the numbers that respectively appear at the left and right of "to" as the minimum value and the maximum value, respectively.

A multilayer nonwoven fabric for foam molding according to the invention contains a dense layer, and a reinforcing layer provided on at least one side of the dense layer, the reinforcing layer is a staple fiber nonwoven fabric containing thermoplastic resin staple fibers (A) having a fiber diameter of more than 20 µm, in an amount of 5% by mass to 50% by mass, and thermoplastic resin staple fibers (B) having a fiber diameter of 20 µm or less, in an amount of 95% by mass to 50% by mass, a total of the thermoplastic resin staple fibers (A) and the thermoplastic resin staple fibers (B) is 100% by mass, the thermoplastic resin staple fibers (A) or the thermoplastic resin staple fibers (B) contain conjugate polyester-based staple fibers (C) formed containing two or more resins having different melting points, and the conjugate polyester-based staple fibers (C) are contained in the reinforcing layer in an amount of 10% by mass to 40% by mass, the dense layer is a nonwoven fabric having bulk density in a range of from 0.05 g/cm$^3$ to 0.3$^3$, and the dense layer and the reinforcing layer are entangled with each other by needle punching.

In a multilayer nonwoven fabric for foam molding according to the invention, a dense layer of a nonwoven fabric having a bulk density in a range of from 0.05 g/cm$^3$ to 0.3 g/cm$^3$ and a reinforcing layer which is a nonwoven fabric containing a specific amount of specific staple fibers are provided while being entangled with each other by needle punching, whereby excellent conformity to the shape of a mold is exhibited during molding processing involving heating, spreading, and compressing, the denseness is satisfactorily maintained even if the multilayer nonwoven fabric is stretched, reduction in thickness is prevented even if the multilayer nonwoven fabric is subjected to thermal compression in the thickness direction, and reinforcing effects can be obtained after the multilayer nonwoven fabric is shaped to the mold. According to this constitution, the multilayer nonwoven fabric exhibits excellent flexibility after being shaped to the mold, can be formed into complicated shapes, can be advantageously processed into a shape suitable for a mold and the like for a foam molded body without cutting or while saving the labor associated with cutting, and exhibits excellent comfortableness when used in a chair and the like. Moreover, the above constitution enables to maintain sufficient denseness throughout the multilayer. Thus, when urethane is foamed on the multilayer nonwoven fabric for foam molding according to the invention, penetration (leakage or oozing) of a foaming resin liquid involving urethane can be advantageously prevented.

A urethane-foam molded complex according to the invention is formed by providing a urethane foam layer on an outer surface of the reinforcing layer of the above multilayer nonwoven fabric for foam molding. It is preferable that the reinforcing layer and the urethane foam layer are formed integrally. When the urethane-foam molded complex is produced using the multilayer nonwoven fabric for foam molding according to the invention, the multilayer advantageously conforms to a desired shape of a metal mold, and the urethane foam layer can be advantageously formed on the multilayer while preventing the leakage of urethane.

In the urethane-foam molded complex according to the invention, since urethane is prevented from leaking toward a multilayer nonwoven fabric which is a base fabric, when the urethane-foam molded complex is used in manufacturing automobile seats, unusual noises caused by friction between metal components and urethane foam can be effectively prevented, and since the flexibility of a nonwoven fabric is satisfactorily maintained, riding comfortableness (sitting comfortableness) can be enhanced.

In a method of producing a multilayer nonwoven fabric for foam molding according to the invention, the reinforcing layer is provided on at least one side of the dense layer, and then the reinforcing layer and the dense layer are entangled with each other by needle punching. According to the production method of the invention, a multilayer nonwoven fabric for foam molding having the above explained excellent characteristics can be advantageously produced.

Hereinafter, the invention will be described specifically.

Multilayer Nonwoven Fabric for Foam Molding

A multilayer nonwoven fabric for foam molding according to the invention contains a dense layer, and a reinforcing layer provided on at least one side of the dense layer, the reinforcing layer is a staple fiber nonwoven fabric containing thermoplastic resin staple fibers (A) having a fiber diameter of more than 20 µm, in an amount of 5% by mass to 50% by mass, and thermoplastic resin staple fibers (B) having a fiber diameter of 20 µm or less, in an amount of 95% by mass to 50% by mass, a total of the thermoplastic resin staple fibers (A) and the thermoplastic resin staple fibers (B) is 100% by mass, the thermoplastic resin staple fibers (A) or the thermoplastic resin staple fibers (B) contain conjugate polyester-based staple fibers (C) formed containing two or more resins having different melting points, and the conjugate polyester-based staple fibers (C) are contained in the reinforcing layer in an amount of 10% by mass to 40% by mass, the dense layer is a nonwoven fabric having bulk density in a range of from 0.05 g/cm$^3$ to 0.3 g/cm$^3$, and the dense layer is preferably constituted of continuous fibers.

In the present invention, the term "staple fiber" indicates fibers having an average fiber length of about 200 mm or less. Meanwhile, the term "continuous fiber" indicates "continuous filament" generally used in this technical field, such as "The nonwoven Fabrics Handbook (INDA, Association of the Nonwoven Fabrics Industry, Japan Nonwovens Report, 1996).

A Fiber Diameter Refers to a Value Obtained by the Following Method

Ten samples of 10 mm×10 mm are obtained from a resultant nonwoven fabric, and the diameter of fibers is read to the first decimal place in the unit of μm at a magnification ratio of 20 using Nikon ECLIPSE E400 microscope. The diameters at arbitrary 30 points are measured for each sample to obtain an average value. When fibers are thin (e.g., a meltblown layer), a sample piece is obtained from a resultant nonwoven fabric, the sample piece is observed at a magnification ratio of 500 or 1000 using a scanning electron microscope, and the fiber diameters (μm) of 30 constituent fibers are measured to obtain an average value.

In this specification, "thermoplastic resin staple fibers (A) having a fiber diameter of more than 20 μm" are also referred to as "thermoplastic resin staple fibers of (A)", "thermoplastic resin staple fibers (B) having a fiber diameter of 20 μm or less" are also referred to as "thermoplastic resin staple fibers of (B)", and "conjugate polyester-based staple fibers (C) formed containing two or more resins having different melting points" are also referred to as "conjugate polyester-based staple fibers of (C)".

Reinforcing Layer

The reinforcing layer constituting the multilayer nonwoven fabric for foam molding according to the invention is a staple fiber nonwoven fabric containing thermoplastic resin staple fibers (A) having a fiber diameter of more than 20 μm, in an amount of 5% by mass to 50% by mass, and thermoplastic resin staple fibers (B) having a fiber diameter of 20 μm or less, in an amount of 95% by mass to 50% by mass, a total of the thermoplastic resin staple fibers (A) and the thermoplastic resin staple fibers (B) is 100% by mass, the thermoplastic resin staple fibers (A) or the thermoplastic resin staple fibers (B) contain conjugate polyester-based staple fibers (C) formed containing two or more resins having different melting points, and the conjugate polyester-based staple fibers (C) are contained in the reinforcing layer in an amount of 10% by mass to 40% by mass.

In view of the shape retention properties of the nonwoven fabric after being shaped to a mold during molding processing, conjugate polyester-based staple fibers (C) formed containing two or more resins having different melting points are used in the reinforcing layer. As a resin which forms the conjugate polyester-based staple fibers of (C), polyethylene terephthalate is preferably contained, and polyethylene may be further contained. When the conjugate polyester-based staple fibers of (C) are formed containing polyethylene terephthalate and polyethylene, it is preferable that the melting point of polyethylene is lower than that of polyethylene terephthalate.

The conjugate polyester-based staple fibers of (C) in the invention may be either conjugate fibers formed of two or more polyesters having different melting points or conjugate fibers formed of one or more polyesters and a resin which is other than polyesters and has a melting point different from that of the polyester resin. More specifically, sheath-core conjugate fibers including a high-melting-point polyethylene terephthalate (PET) resin and a low-melting-point PET resin and sheath-core conjugate fibers including a high-inelting-point PET resin and a low-inelting-point polyethylene (PE) resin are exemplified.

The melting point of at least one resin which forms the conjugate polyester-based staple fibers of (C) is preferably in a range of from 110° C. to 190° C., more preferably from 110° C. to 140° C., and still more preferably from 110° C. to 120° C. It is preferable that the resin having a melting point of from 110° C. to 190° C. is a resin having the lowest melting point (low-melting-point resin among the resins which form conjugate polyester-based staple fibers.

The content of the low-melting-point resin in the conjugate polyester-based staple fibers of (C) is preferably 10% by mass to 50% by mass, more preferably 20% by mass to 40% by mass, and still more preferably 25% by mass to 35% by mass.

The content of the conjugate polyester-based staple fibers of (C) in a reinforcing layer influences the shape retention properties after a nonwoven fabric is shaped to a mold and flexibility and thickness of the nonwoven fabric. The reinforcing layer according to the invention contains 10% by mass to 40% by mass of the conjugate polyester-based staple fibers of (C). If the content of the conjugate polyester-based staple fibers of (C) is less than 10% by mass, although the flexibility and thickness of a nonwoven fabric after the nonwoven fabric is shaped to a mold are sufficient, adhesion between fibers is insufficient to cause a deficiency in the shape retention properties to a mold. If the content of the conjugate polyester-based staple fibers of (C) is more than 40% by mass, although the shape retention properties to a mold is sufficient, the adhesion between fibers becomes excessive, and a nonwoven fabric becomes hard, so that flexibility is impaired. Moreover, a thickness of a portion compressed in a thickness direction during heating, spreading, and compressing processing is extremely reduced, and it is not preferable because this portion causes leakage of urethane during urethane foaming processing. More preferably, the reinforcing layer contains the conjugate polyester-based staple fibers of (C) in an amount of 20% by mass to 35% by mass.

The fiber diameter of the conjugate polyester-based staple fibers of (C) is not particularly limited, and the conjugate polyester-based staple fibers of (C) having a fiber diameter of 10 μm to 30 μm may be used, and in view of effectively increasing the number of adhesive points between fibers during heating, spreading, and compressing processing and well balancing the shape retention properties and the flexibility, the fiber diameter of at least a portion of the conjugate polyester-based staple fibers of (C) is preferably 20 μm or less, more preferably 18 μm or less, still more preferably 17 μm or less, and particularly preferably 15 μm or less.

When the conjugate polyester-based staple fibers of (C) include fibers having a fiber diameter of 20 μm or less, the fiber diameters of all the conjugate polyester-based staple fibers of (C) may be 20 μm or less, or the conjugate polyester-based staple fibers of (C) may be in the form of mixed fibers further including conjugate polyester-based staple fibers having a fiber diameter of more than 20 μm. The rate of the conjugate polyester-based staple fibers having a fiber diameter of 20 μm or less of the total mass of the conjugate polyester-based staple a fibers of (C) is not particularly limited, and the content ratio of the thermoplastic resin staple fibers of (A) and the thermoplastic resin staple fibers of (B) can be suitably adjusted as long as it satisfies the range of the present invention.

The reinforcing layer according to the present invention contains the thermoplastic resin staple fibers (A) having a fiber diameter of more than 20 μm and thermoplastic resin staple fibers (B) having a fiber diameter of 20 μm or less, and the total of the thermoplastic resin staple fibers of (A) and the thermoplastic resin staple fibers of (B) is 100% by mass.

The content of the thermoplastic resin staple fibers of (A) in the reinforcing layer is 5% by mass to 50% by mass. The content of the thermoplastic resin staple fibers of (A) influences a thickness of a nonwoven fabric after the nonwoven fabric is shaped to a mold. When the content of the thermoplastic resin staple fibers of (A) in the reinforcing layer is in the above range, sufficient thickness is ensured, and reduction in thickness can be easily prevented even if a nonwoven fabric is subjected to thermal compression in the thickness direction. If the content of the thermoplastic resin staple fibers of (A) is more than 50% by mass, although the thickness of a nonwoven fabric is satisfactorily ensured, a gap of the reinforcing layer becomes too large, thus impairing the strength, urethane leaks when the urethane is foamed on the reinforcing layer, or urethane reinforcing effects are reduced, and thus it is not preferable. If the content of the thermoplastic resin staple fibers of (A) is less than 5% by mass, although the strength as the reinforcing layer tends to be high, the thickness of a nonwoven fabric is excessively reduced to cause a deficiency in flexibility, or urethane leakage is apt to occur when urethane is foamed on the reinforcing layer, and thus it is not preferable. In the reinforcing layer, the content of the thermoplastic resin staple fibers of (A) is more preferably 10% by mass to 45% by mass and still more preferably 15% by mass to 40% by mass.

The fiber diameter of the thermoplastic resin staple fibers of (A) is not particularly limited as long as it is more than 20 μm, and the fiber diameter is preferably 23 μm or more and more preferably 25 μm or more. The upper limit of the fiber diameter of the thermoplastic resin staple fibers of (A) is preferably approximately 45 nm in consideration of flexibility of a resultant nonwoven fabric and entangling function with other fibers of a reinforcing layer. The upper limn of the fiber diameter of the thermoplastic resin staple fibers of (A) is more preferably 39 μm.

The thermoplastic resin staple fibers of (A) may include as a part thereof the conjugate polyester-based staple fibers of (C).

The content of the thermoplastic resin staple fibers of (B) in the reinforcing layer is 50% by mass to 95% by mass, preferably 50% by mass to 70% by mass, and more preferably 50% by mass to 65% by mass. When the above composition ratio is satisfied, staple fibers having a small fiber diameter are suitably included, so that a gap balance of the reinforcing layer is optimized. Consequently, a resultant nonwoven fabric becomes soft, and, in addition, urethane can be prevented from being leaked when the urethane is foamed. In addition, suitable nonwoven fabric extensibility can be obtained, so that there can be obtained an effect that conformity to the shape of a mold during heating, spreading, and compressing processing is improved.

The fiber diameter of the thermoplastic resin staple fibers of (B) is not particularly limited as long as it is 20 μm or less, and the fiber diameter is preferably 18 μm or less, more preferably 17 μm or less, and still more preferably 15 μm or less. The lower limit of the fiber diameter of the thermoplastic resin staple fibers of (B) is preferably approximately 10 μm in consideration of entangling function with other fibers of a reinforcing layer and is more preferably 12 μm.

It is preferable that the thermoplastic resin staple fibers of (B) includes as a part thereof the conjugate polyester-based staple fibers of (C).

The materials of the thermoplastic resin staple fibers of (A) and the thermoplastic resin staple fibers of (B) are not particularly limited as long as they are thermoplastic resins capable of forming a nonwoven fabric, and various well-known thermoplastic resins may be used. As thermoplastic resin staple fibers, polyolefin staple fibers formed of propylene-based polymer and the like, and polyester-based staple fibers are preferably used independently in the thermoplastic resin staple fibers of (A) and the thermoplastic resin staple fibers of (B), and the polyester-based staple fibers are more preferably used in view of having thermal stability during heating, spreading, and compressing processing and rigidity against thermal compression in a thickness direction.

It is preferable that the thermoplastic resin staple fibers of (A) other than the conjugate polyester-based staple fibers of (C), and the thermoplastic resin staple fibers of (B) other than the conjugate polyester-based staple fibers of (C) are high-melting-point polyester-based staple fibers having a melting point of more than 190° C. If the melting point is more than 190° C., melting of fibers due to heat received during heating, spreading, and compressing processing is prevented. If fibers are melted, a nonwoven fabric is hardened, or a thickness of a portion which has been compressed in a thickness direction is extremely reduced, and it is not preferable because this portion causes leakage of urethane during urethane foaming.

Each average fiber length of the conjugate polyester-based staple fibers of (C), the thermoplastic resin staple fibers of (A), and the thermoplastic resin staple fibers of (B) is usually 200 mm or less and is preferably in a range of from 10 mm to 100 mm, and more preferably in a range of from 30 mm to 90 mm.

In the conjugate polyester-based staple fibers of (C), as long as the conjugate polyester-based staple fibers of (C) is constituted containing two or more resins having different melting points, there is no limitation on other configurations, and the conjugate polyester-based staple fibers of (C) may be mixed fibers including two or more fibers having different shapes.

Each of the thermoplastic resin staple fibers of (A) and the thermoplastic resin staple fibers of (B) may be mixed fibers obtained by mixing two or more fibers such as mixed fibers obtained by mixing fibers including two or more kinds of different thermoplastic resins and mixed fibers obtained by mixing two or more kinds of fibers having different shapes.

The conjugate polyester-based staple fibers of (C), the thermoplastic resin staple fibers of (A), and the thermoplastic resin staple fibers of (B) may be side-by-side or sheath-core conjugate fibers. The cross-sectional shape of the staple fibers may be any of circular shapes and odd-shapes such as hollow shape, V shapes, X shapes, and T shapes. Crimped fiber or latently crimpable fibers may be used.

The staple fibers may be formed into nonwoven fabrics by known methods, and a preferred method may be mechanical bonding by needle punching, or thermal fusion bonding. In order to efficiently stack the nonwoven fabric with a subsequent dense layer, the reinforcing layer is preferably formed into the nonwoven fabric by needle punching in advance.

The bulk density of the reinforcing layer is preferably less than or equal to the bulk density of the dense layer, and although the bulk density of the reinforcing layer is not particularly limited, the bulk density of the reinforcing layer is usually in the range of from 0.01 g/cm$^3$ to 0.1 g/cm$^3$, preferably in the range of from 0.02 g/cm$^3$ to 0.09 g/cm$^3$, and more preferably in the range of from 0.03 g/cm$^3$ to 0.08 g/cm$^3$.

The basis weight of the reinforcing layer is usually in the range of from 40 g/m$^2$ to 180 g/m$^2$, preferably in the range of from 40 g/m$^2$ to 160 g/m$^2$, more preferably in the range of from 40 g/m$^2$ to 150 g/m$^2$, still more preferably in the range from 45 g/m$^2$ to 130 g/m$^2$, and particularly preferably in the range of from 50 g/m$^2$ to 100 g/m$^2$.

The reinforcing layer may be composed of a single layer, or two or more layers. When the reinforcing layer is a multilayer of two or more layers, the reinforcing layer may be constituted of the same or different nonwoven fabrics. When the reinforcing layer is constituted of two or more layers of nonwoven fabrics, the nonwoven fabrics may be layered beforehand and entangled or bonded with each other by a known method, or the nonwoven fabrics may be collectively provided as the reinforcing layer to form the multilayer nonwoven fabric for foam molding when the multilayer nonwoven fabric for foam molding is produced.

Specific examples of the polyesters constituting the conjugate polyester-based staple fibers of (C) include polyethylene terephthalate (PET), polytrimethylene terephthalate (PTT), polybutylene terephthalate (PBT), polylactic acid (PLA), copolymers of these polymers, and combination of these polymers. In view of molding properties, such polyesters as polyethylene terephthalate (PET), polytrimethylene terephthalate (PIT), and polybutylene terephthalate (PBT) are more preferable. When the thermoplastic resin staple fibers of (A) and the thermoplastic resin staple fibers of (3) are constituted of polyesters, as the polyesters, the above mentioned polyesters can be exemplified. Preferred polyesters are similar to those mentioned above.

Various well-known additives may be added to the resins which form the thermoplastic resin staple fibers of (A), the thermoplastic resin staple fibers of (B), and the conjugate polyester-based staple fibers of (C), as long as the object of the invention is not impaired. Examples of such additives include antioxidants, weather stabilizers, light stabilizers, antiblocking agents, lubricants, nucleating agents, pigments, softeners, hydrophilic agents, auxiliaries, water repellents, fillers, antibacterial agents, flame retardants, deodorants, and adsorbents. Those additives may be added to the surface of fibers after the formation of nonwoven fabrics by methods such as spraying.

The reinforcing layer according to the invention may be provided on only one side or on both sides of the dense layer.

Dense Layer

The dense layer constituting the multilayer nonwoven fabric for foam molding according to the invention is a nonwoven fabric whose bulk density is in a range of from 0.05 g/cm$^3$ to 0.3 g/cm$^3$ and is preferably formed of continuous fibers. In the invention, when heat of approximately 180° C. is applied during molding processing involving heating, spreading, and compressing, in terms of heat resistance, the fibers constituting the dense layer is preferably polyolefin-based fibers formed of propylene-based polymer and the like, or polyester-based fibers. More preferred are polyester-based fibers in terms of heat resistance stability. However, if the temperature of heat applied during molding processing is up to approximately 110° C., polyolefin-based fibers formed of propylene-based polymer and the like are more preferably used in terms of flexibility and productivity. The fibers constituting the dense layer may be formed of polymers other than polyolefin-based fibers and a polyester-based polymer.

In the dense layer, polymers which form the fibers are not particularly limited as long as they can form nonwoven fabrics, and various well-known thermoplastic resins may be used. Specific examples of the polymers include polyolefins such as polypropylenes (propylene homopolymers), polypropylene random copolymers, poly(1-butene), poly(4-methyl-1-pentene), ethylene/propylene random copolymers, ethylene/1-butene random copolymers and propylene/1-butene random copolymers, polyesters (such as polyethylene terephthalate, polybutylene terephthalate, and polyethylene naphthalate), polyamides (such as nylon-6, nylon-66, and polymethaxyleneadipamide), polyvinyl chloride, polyimides, ethylene/vinyl acetate copolymers, ethylene/vinyl acetate/vinyl alcohol copolymers, ethylene/(meth)acrylic acid copolymers, ethylene/acrylate/carbon monoxide copolymers, polyacrylonitriles, polycarbonates, polystyrenes, ionomers, and mixtures of these resins.

Among these thermoplastic resins, polyolefins are preferable in terms of spinning stability during molding as well as processability, air permeability, flexibility, lightweight and heat resistance of the nonwoven fabrics, propylene-based polymers are more preferable, and polypropylene or polypropylene random copolymers are still more preferable.

Preferred propylene-based polymers include homopolymers of propylene having a melting point (Tm) of 125° C. or more, preferably in a range of from 130° C. to 165° C. and copolymers of propylene as a main component with one or two or more α-olefins having a carbon number of 2 or more (except for 3), preferably 2 to 8 (except for 3), such as ethylene, 1-butene, 1-pentene, 1-hexene, 1-octene, and 4-methyl-1-pentene.

The melt flow rate (MFR: ASTM D-1238, 230° C., 2160 g load) of the propylene-based polymer is not particularly limited as long as the polymer can be melt spun. When the propylene-based polymer is used in the mehblown nonwoven fabric, the melt flow rate thereof is usually in the range of from 10 g/10 min to 3000 g/10 min, preferably in the range of from 50 g/10 min to 2000 g/10 min, and more preferably in the range of from 100 g/10 min to 1000 g/10 min. When the polymer is used in the spunbonded nonwoven fabrics or the reinforcing layer, the melt flow rate thereof is usually in the range of from 1 g/10 min to 500 g/10 min, preferably in the range of from 5 g/10 min to 200 g/10 min, and more preferably in the range of from 10 g/10 min to 100 g/10 min.

The thermoplastic resins according to the present invention may contain various well-known additives, as long as the object of the invention is not impaired. Examples of the additives include antioxidants, weather stabilizers, light stabilizers, antiblocking agents, lubricants, nucleating agents, pigments, softeners, hydrophilic agents, auxiliaries, water repellants, fillers, antibacterial agents, flame retardants, deodorants, and adsorbents.

The bulk density of the dense layer is in the range of from 0.05 g/cm$^3$ to 0.3 g/cm$^3$, and preferably in the range of from 0.05 g/cm$^3$ to 0.15 g/cm$^3$. If the bulk density of the dense layer is in the above range, the denseness of fibers can be maintained even after the entanglement and thus being effective for preventing the leakage of urethane, and thus it is preferable.

The basis weight of the dense layer is usually in the range of from 10 g/m² to 60 g/m², preferably in the range of from 10 g/m² to 35 g/m², and more preferably in the range of from 10 g/m² to 25 g/m². If the basis weight of the dense layer is 10 g/cm² or more, strength is enhanced, and handleability is excellent even after the reinforcing layer is provided on the dense layer. If the basis weight is 60 g/m² or less, a lightweight effect can be obtained, and in addition, the nonwoven fabric is easily stretched while being heated, spread, or compressed to conform to the shape of a mold, The air permeability of the dense layer is preferably in the range of from 50 cm³/cm²/sec to 300 cm³/cm²/sec, more preferably in the range of from 50 cm³/cm²/sec to 250 cm³/cm²/sec, and still more preferably in the range of from 70 cm³/cm²/sec to 200 cm³/cm²/sec. If the air permeability of the dense layer is in the above range, the denseness of fibers can be maintained after the reinforcing layer is provided on the dense layer, and the performance of preventing urethane leakage is good. Moreover, since a urethane foam layer can be accordingly densely formed, it is effective for enhancement of rigidity of foams.

It is preferable that the dense layer includes a nonwoven fabric which is partially thermocompression-bonded, air through processed, resin bonded, or calendered, it is more preferable that the dense layer is partially thermocompression-bonded and embossed. In the invention, theterm "partially" indicates an area ratio in the range of from 5% to 30% and preferably in the range of from 5% to 20%.

The dense layer may further include a nonwoven fabric which has not been subjected to the process of partial thermocompression-bonding, air through processing, resin bonding, or calender processing. Alternatively, the dense layer may include a plurality of nonwoven fabrics each of the nonwoven fabrics has been subjected to these processings.

It is preferable that the dense layer satisfies the above described bulk density, basis weight, and air permeability, and various well-known nonwoven fabrics may be used, and examples of the nonwoven fabrics include spunbonded nonwoven fabrics, meltblown nonwoven fabrics, wet-laid nonwoven fabrics, dry-laid nonwoven fabrics, air-laid pulp nonwoven fabrics, flash-spun nonwoven fabrics, and spread-fiber nonwoven fabrics. Among those nonwoven fabrics, in view of simultaneously realizing the strength and lightweight of a resultant multilayer nonwoven fabric for foam molding, preferred is spunbonded nonwoven fabrics or spunbondedimeltblown nonwoven fabrics (SM(S)) in which the dense layer is formed by providing a spunbonded nonwoven fabric layer (S) on at least one side of a meltblown nonwoven fabric layer (M), and the meltblown nonwoven fabric layer and the spunbonded nonwoven fabric layer are partially thertnocotnpression-bonded. In terms of obtaining suitable strength and air permeability while realizing the lightweight, more preferred is SMS nonwoven fabrics in which the spunbonded nonwoven fabric layers (S) are provided on both sides of the meltblown nonwoven fabric layer (M), and the meltblown nonwoven fabric layer (M) and the the spunbonded nonwoven fabric layers (S) are partially thermocompression-bonded with each other.

The dense layer may be constituted of one sheet of SMS nonwoven fabrics which is partially thermocompressi on-bonded, air through processed, resin bonded, or calendered, or may be a multilayer including a plurality sheets of SMS nonwoven fabrics in which each SMS nonwoven fabrics is partially thermocompression-bonded, air through processed, resin bonded, or calendered.

The meltblown nonwoven fabric layer (M) suitable in the invention is a nonwoven fabric layer formed of the above mentioned thermoplastic resin, and the fiber diameter is usually in the range of front 0.1 µm to 5 µm and preferably in the range of from 0.5 µm to 3 µm, and the basis weight is in the range of from 0.1 g/m² to 5 g/m² and preferably in the range of from 1 g/m² to 3 g/m².

If the fiber diameter and the basis weight of the meltblown nonwoven fabric layer (M) are in the above ranges, when it is used as a dense layer, leakage of urethane can be effectively prevented. At the same time, when the dense layer and a substrate layer are bonded with each other by needle punching, the fibers of the meltblown nonwoven fabric layer (M) is hardly cut by a needle, and, in addition, the weight of a resultant multilayer nonwoven fabric for foam molding can be reduced.

The spimbonded nonwoven fabric layer (S) suitable in the invention is a nonwoven fabric layer formed of the above thermoplastic resin, and the fiber diameter is usually in the range of from 10 µm to 40 µm and preferably in the range of from 10 µm to 20 µm, and the basis weight is in the range of from 5 g/m² to 25 g/m² and preferably in the range of from 5 g/m² to 10 g/m².

If the fiber diameter and the basis weight of the spunbonded nonwoven fabric layer (S) are in the above ranges, when the dense layer and the reinforcing layer are bonded with eaCh other by needle punching, the fibers of the dense layer and the fibers of the reinforcing layer can be toughly entangled with each other, and, at the same time, the lightweight and strength of the multilayer nonwoven fabric for foam molding can be simultaneously realized, and leakage of urethane can be effectively prevented.

The spunbonded/meltblown nonwoven fabrics (SM(S)) are produced by a combination of a method of producing various well-known meltblown nonwoven fabric and a method of producing a spunbonded nonwoven fabric.

Specifically, for example, beforehand, the above thermoplastic resin is spun from spinneret nozzles, and the continuous fiber filaments that have been spun are quenched with a cooling fluid and are attenuated to a desired fineness by applying a tension to the filaments by stretching air. The resultant filaments are then collected on a moving collection belt to obtain a spunbonded nonwoven fabric layer (S). Thereafter, the thermoplastic resin is melted and extruded on the spunbonded nonwoven fabric layer (S), and fibers spun from a meltblowing spinneret are spun as an ultrafine fiber stream by a high-temperature and high-speed gas. The stream of the ultrafine fibers are formed into an ultrafine fiber web by a collection device, and a meltblown nonwoven fabric layer (M) is formed. Subsequently, another spunbonded nonwoven fabric layer (S) is provided onto the meltblown nonwoven fabric layer (M), followed by partial thermocompression-bonding, whereby the spuribonded/ meltblown nonwoven fabrics (SMS) can be produced.

The dense layer (in particular, the meltblown nonwoven fabric layer (M) and the spunbonded nonwoven fabric layer (S)) is partially thermocompression-bonded, air through processed, resin bonded, or calendered, and various well-known methods can be adopted as these processing methods. Particularly, when the dense layer is partially thermocompression-bonded by embossing or the like, the bulk density of a resultant dense layer is easily adjusted in the above range, and the strength and rigidity of the dense layer are improved, the dense layer does not sag and can be easily attached to a mold to achieve an improvement in working speed. Further, embossing is preferable also in view of the prevention of the passage of a resin liquid for foam molding containing urethane.

When the thermocompression-bonding is performed by hot embossing, the embossing area ratio is usually in the range of from 5% to 30% and preferably in the range of from 5% to 20%. Examples of embossing shapes include circle shapes, elliptical shapes, oval shapes, square shapes, rhombic shapes, rectangular shapes, quadrangular shapes, quilt shapes, grid shapes, tortoiseshell shapes, and continuous shapes based on these shapes.

In general, since the fiber diameter of the fibers which form the spunbonded nonwoven fabric layer (S) is larger than the fiber diameter of the fibers which form the meltblown nonwoven fabric layer (M), it is preferable that in the dense layer according to the invention, the spunbonded nonwoven fabric layer (S) is provided on both sides (both surfaces) of the meltblown nonwoven fabric layer (M). According to this constitution, the spunbonded nonwoven fabric layer (S) more effectively serves to reinforce the meltblown nonwoven fabric layer (M).

The dense layer may be constituted of one layer of nonwoven fabrics, or may be constituted of two or more layers of nonwoven fabrics. When the dense layer is constituted of two or more layers of nonwoven fabrics, the nonwoven fabrics may be the same or different from one another. When the dense layer is constituted of two or more layers of nonwoven fabrics, the nonwoven fabrics may be layered beforehand and entangled or bonded with each other by a known method, or the nonwoven fabrics may be collectively provided as the dense layer to form the multilayer nonwoven fabric for foam molding when the multilayer nonwoven fabric for foam miding is produced.

Multilayer Nonwoven Fabric for Foam Molding

The multilayer nonwoven fabric for foam molding according to the invention is formed by providing a reinforcing layer on at least one side of a dense layer, and the dense layer and the reinforcing layer are entangled with each other by needle punching.

The multilayer nonwoven fabric for foam molding according to the invention is formed by providing the reinforcing layer on at least one side of the dense layer, preferably on both sides of the dense layer. The dense layer usually has a bulk density higher than that of the reinforcing layer. When the reinforcing layer is provided on only one side of the dense layer, a foam molded body such as a urethane foam layer is formed on the surface on which the reinforcing layer is provided.

In order to ensure fabric extensibility as a multilayer nonwoven fabric when the nonwoven fabric is shaped to a mold, thickness after finishing, and flexibility, it is preferable that the reinforcing layer is a main constituent of the multilayer nonwoven fabric, and the dense layer is suppressed to a necessity minimum, and it is preferable that each basis weight and configuration of the reinforcing layer and the dense layer are in the above ranges.

The basis weight as the muhilayer nonwoven fabric for foam molding is preferably in thean rge of from 20 g/m$^2$ to 160 g/m$^2$, more preferably in the range of from 40 g/m$^2$ to 140 g/m$^2$, and still more preferably in the range of from 50 g/m$^2$ to 120 g/m$^2$. If the basis weight of the multilayer nonwoven fabric for foam molding is 20 g/m$^2$ or more, the strength is sufficient, handleability is excellent, and, in addition, the thickness is sufficient, so that urethane leakage can be easily prevented. If the basis weight of the multilayer nonwoven fabric for foam molding is 160 g/m$^2$ or less, an excellent lightweight property is exhibited, and the nonwoven fabric is easily stretched while being shaped to a mold.

In the multilayer nonwoven fabric for foam molding according to the invention, in order to ensure thickness in view of ensuring urethane leakage prevention and flexibility, even if entangling processing by needle punching is weakened, the strength as the multilayer is maintained well as compared with a multilayer nonwoven fabric for foam molding constituted of only a reinforcing layer. The thickness of the multilayer nonwoven fabric for foam molding according to the invention is preferably 1.6 mm to 5.0 mm and more preferably 2.0 mm to 4.5 mm. If the thickness of the multilayer nonwoven fabric for foam molding is 1.6 mm or more, there is a tendency that urethane leakage can be further prevented, and, in addition, the multilayer nonwoven fabric for foam molding is excellent in flexibility of a nonwoven fabric layer. If the thickness of the muhilayer nonwoven fabric for foam molding is 5.0 mm or less, there is a tendency that the multilayer nonwoven fabric for foam molding is excellent in conformity to the shape of a mold.

The multilayer nonwoven fabric for foam molding according to the invention is allowed to have a thickness of the fabric after being held at 110° C. and 4.9 Pa for 5 minutes is 1.2 mm or more, the thickness of the fabric after being held at 110° C. and 4.9 Pa for 5 minutes is 1.2 mm or more, the thickness reduction can be prevented even if the multilayer is subjected to thermal compression in the thickness direction, and there is an advantage that leakage during urethane foaming can be prevented. The thickness is more preferably 1.3 mm or more, still more preferably 1.4 mm or more, and particularly preferably 1.5 mm or more.

It is preferable that the multilayer nonwoven fabric for foam molding according to the invention has sufficient denseness to prevent a foamed resin such as urethane from leaking at the stage of molding the foam molded body. In addition, it is more preferable for the multilayer that the air permeability is maintained. In the multilayer nonwoven fabric for foam molding, the air permeability at a pressure difference of 125 Pa is preferably 20 cm$^3$/cm$^2$/sec to 160 cm$^3$/cm$^2$/sec, more preferably from 25 cm$^3$/cm$^2$/sec to 160 cm$^3$/cm$^2$/sec, still more preferably from 25 cm$^3$/cm$^2$/sec to 140 cm$^3$/cm$^2$/sec, particularly preferably from 30 cm$^3$/cm$^2$/sec to 125 cm$^3$/cm$^2$/sec, and extremely preferably from 30 cm$^3$/cm$^2$/sec to 115 cm$^3$/cm$^2$/sec. If the air permeability of the multilayer nonwoven fabric for foam molding is in the above range, performance of preventing leakage of a foamed resin such as urethan is excellent, and, at the same time, a gas generated in the foam molding can be advantageously discharged. Moreover, since a foam layer can be accordingly densely formed, it is effective for enhancement of rigidity of foams.

Further, the multilayer nonwoven fabric for foam molding according to the invention has a tensile strength (N/50 mm) of, although not particularly limited to, 30 N or more and preferably 40 N or more. This tensile strength advantageously ensures excellent handleability.

The multilayer nonwoven fabric for foam molding according to the invention may be used in foam molding in the form of multilayers including additional substrate layers, as long as the effects of the invention are not impaired.

Specific examples of the additional substrate layers to be provided with the multilayer nonwoven fabric for foam molding according to the invention include knitted fabrics, woven fabrics, nonwoven fabrics, films, and paper products. As a method of providing (laminating) the multilayer nonwoven fabric of this invention and other layers together, there can be adopted various well-known methods including thermal fusion bonding methods such as hot embossing and ultrasonic fusion bonding, mechanical entangling methods such as needle punching and water jetting, methods using adhesives such as hot melt adhesives and urethane adhesives, and extrusion lamination.

Method of Producing Multilayer Nonwoven Fabric for Foam Molding

In the method for producing a multilayer nonwoven fabric for foam molding according to the invention, a reinforcing layer is provided on at least one side of a dense layer, and the dense layer and the reinforcing layer are then entangled with each other by needle punching. The multilayer nonwoven fabric for foam molding is formed by bonding the dense layer and the reinforcing layer by various well-known methods, specifically including thermal fusion bonding methods such as hot embossing and ultrasonic fusion bonding, mechanical entangling methods such as needle punching and water jetting, methods using adhesives such as hot melt adhesives and urethane adhesives, and extrusion lamination. In the bonding of the dense layer and the reinforcing layer, an entangling method of mechanically bonding them by needle punching or a thermal fusion bonding method of fusion bonding them by heating treatment may be adopted. Particularly, in this invention, a multilayer in which the dense layer and the reinforcing layer are integrated by entangling by needle punching is provided. According to this constitution, the dense layer and the reinforcing layer are bonded with uniform mechanical entanglement. Moreover, in thickness and denseness as a multilayer, an optimal balance can be maintained by needle punching. Thus, the multilayer nonwoven fabric for foam molding according, to the invention does not interfere with the stage of three-dimensionally following the shape of a mold used for producing a foam molded body, suppresses thickness unevenness due to spreading involved during the following, and can maintain good denseness and flexibility throughout the entirety thereof. At the same time, a resultant multilayer nonwoven fabric for foam molding maintains suitable air permeability to allow the passage of a gas generated during foam molding of urethanes or the like and can control the impregnation with liquids such as urethanes to prevent leakage.

When the layers are bonded (entangled) by needle punching, an oil agent such as a softener or a slip agent may be kneaded into or applied to the nonwoven fabrics for the purposes of reducing the probability for the fibers to be cut during needle punching as well as reducing unusual noises between foams and metal components, as long as the effects of the invention are not impaired.

In the multilayer nonwoven fabric for foam molding according to the invention, for example when a dense layer in which the spunbonded nonwoven fabric layer (S) is provided on both sides of the ineltblown nonwoven fabric layer (M) by partial thermocompression-bonding is used, if the dense layer and the reinforcing layer are bonded with each other by needle punching, the fibers which form the spunbonded nonwoven fabric layer (S) and the fibers which form the reinforcing layer are adequately entangled with each other without fiber breakage, thereby achieving high bonding strength between the dense layer and the reinforcing layer. In addition, even if the fibers of the meltblown nonwoven fabric layer (M) are cut by needles, there is no risk that the fiber dust will come on the surface of the multilayer nonwoven fabric for foam molding.

In the multilayer nonwoven fabric for foam molding according to the invention, the dense layer and the reinforcing layer are bonded by the needle punching method as described above, and since the dense layer exercises the effects as a substrate layer, the configuration of the reinforcing layer can be freely adjusted in the range as described above. The effects of the dense layer as a substrate layer appear as a strength retention effect as a multilayer, a fiber retention (fall prevention) effect for staple fibers of the reinforcing layer, and a dimension stabilizing effect as a multilayer when the nonwoven fabric conforms to the shape of a mold during heating/spreading/compressing processing. In comparison with the case of using a single reinforcing layer (staple fibers), suitable strength and suitable fabric extensibility can be obtained, and excessive heat shrinkage can be prevented.

The multilayer nonwoven fabric for foam molding according to the invention may be subjected to secondary processing such as gear processing, printing, coating, lamination, heat treatment, molding processing, water-repellent treatment, or hydrophilic treatment, as long as the effects of the invention are not impaired.

The multilayer nonwoven fabric for foam molding according to the invention is applicable to any foam molded article, and for example when the multilayer is applied to foam molded articles formed of urethane and the like, good rigidity, anti-noise performance, and riding comfortableness can be given thereto. For example, the multilayer nonwoven fabric for foam molding according to the invention may be applied to the molding of foam molded articles in various applications including vehicle seats such as automobile seats, furniture, office chairs and beds.

Urethane-Foam Molded Complex

A urethane-foam molded complex according to the invention is obtained by providing a urethane foam layer on an outer surface of the reinforcing layer of the above described muttilayer nonwoven fabric for foam molding of the invention. It is preferable that the urethane-foam molded complex of the invention is obtained by integrally forming the reinforcing layer of the multilayer nonwoven fabric for foam molding of the invention and the urethane foam layer. The urethane foam layer is usually produced by foam molding polyurethane in a mold having a desired shape. For example, the urethane-foam molded complex of the invention may be manufactured by arranging the multilayer nonwoven fabric for foam molding of the invention in a mold such as a metal mold so as to conform to a portion such as the top or the bottom of the mold, then pouring a polyurethane raw material including a foaming agent into the mold, and foam molding the polyurethane raw material.

According to the invention, the multilayer nonwoven fabric for foam molding exhibits excellent conffil inability to the shape of a mold and can simultaneously realize sufficient denseness and flexibility throughout the entirety thereof even after it is set in conformity to the mold. Thus, urethane can be prevented from leaking, polyurethane foams can be prevented from leaking to a surface, and a urethane-foam molded complex integrated with a molded body can be manufactured.

For example, the urethane-foam molded complex according to the invention may be suitably applied to various applications using an urethane foam molded body, including vehicle seats in vehicles such as automobiles, trains, airplanes, and play equipment, furniture such as chairs and beds, toys, and building materials.

By virtue of the use of the multilayer nonwoven fabrics for foam molding according to the invention, the urethane-foam molded complex according to the invention can be manufactured simply by foam molding on the reinforcing materials arranged in molds without entailing complicated processes such as cutting and sewing of the reinforcing materials. When used in combination with metal components or the like as is the case in applications such as vehicle seats, urethane-foam molded complex provides advantageous effects such as that the occurrence of unusual noises caused by friction between the metal components and urethane foam can be effectively prevented, and good riding comfortableness (sitting comfortableness) can be realized.

The urethane-foam molded complex according to the invention is applicable to any foam molded article, and for example when urethane-foam molded complex is applied to foam molded articles formed of urethane and the like, good rigidity, anti-noise performance, and riding comfonableness (sitting comfortableness) can be given thereto. For example, the urethane-foam molded complex according to the invention may be applied to the molding of foam molded articles in various applications including vehicle seats such as automobile seats, furniture, office chairs and beds.

EXAMPLES

Hereinafter, the present invention will be more specifically described based on examples. However, the invention is not limited to the examples.

Properties in examples and comparative examples were measured by the following methods.

(1) Basis Weight (g/m$^2$)

Ten samples having a size of 100 mm in a machine direction (MD) and 100 mm in a cross direction (CD) were obtained from a nonwoven fabric, and the average of the weights per unit area thereof was calculated.

(2) Thickness Mm)

The thickness was measured at five points, namely, the center and the four corners of the basis weight measurement samples, and the average thickness of the 50 points was calculated. The thickness meter with ulnad of 2 g/cm$^2$ m (load area: 4 cm$^2$) was used.

(3) Bulk Density (g/Cm$^3$)

The bulk density of the nonwoven fabric was determined from the following equation using the basis weight and the thickness obtained in (1) and (2).

Bulk density=basis weight (g/m$^2$)/(thickness mm)/10× 100×100)

(4) Tensile Strength (N/50 mm) and Elongation (%)

The tensile strength and the elongation were measured in accordance with JIS L1906 (2010). Test pieces of 300 mm (MD)×50 mm (CD) were obtained from a multilayer nonwoven fabric for foam raiding. The test piece was tested with a tensile tester (AUTOGRAPH AGS-J manufactured by Shimadzu Corporation), by being clamped between chucks 200 mm apart from each other, and was pulled at a head speed of 100 mm/min. The test was performed five times with respect to MD (length direction of the nonwoven fabric), and five times with respect to CD (direction perpendicular to the length). The average values thereof were calculated to obtain the tensile strength and the elongation.

(5) Air Permeability (Cm$^3$/Cm$^2$/Sec)

A test piece of 200 mm (MD)×50 mm (CD) was obtained from a multilayer nonwoven fabric for foam molding, and the flow rate at a pressure difference of 125 Pa was measured by a Frazier air permeability tester in accordance with JIS L1096 (2010) to obtain air permeability.

(6) Molding Properties

A 20 cm square simple mold having a height of 10 cm was covered with a 40 cm square piece (400 mm (MD)×400 mm (CD)) of a multilayer nonwoven fabric for foam molding, and the multilayer nonwoven fabric was mold processed at 200° C. with a vacuum forming machine. Molding properties were evaluated based on visual inspection and feel (touch) according to the following criteria with respect to items such as the easiness in molding the muitilayer nonwoven fabric to the mold, and the shape retention properties, the dimension stability, and the texture (flexibility) of the shaped nonwoven fabric.

AA: Molding was feasible and the multilayer maintained good appearance and texture required for a reinforcing material A: Molding was feasible and the multilayer was acceptable for use as a reinforcing material B: Molding was feasible but the multilayer had a poor texture for use as a reinforcing material BB: Molding failed due to problems such as melting (7) Thickness after Hot Pressing A 5 kg load was applied to a 10 cm square (100 min (MD)×100 mm (CD)) nonwoven fabric, and the thickness of the nonwoven fabric after being stood in an oven at 110° C. for 5 minutes was measured.

(8) Evaluation of Urethane Leakage

A 40 cm square piece (400 mm (MD)×400 mm (CD)) of a multilayer nonwoven fabric for foam molding was attached to a foaming mold, and the occurrence of urethane leakage was visually evaluated based on the following criteria.

AA: No leakage
A: Substantially no leakage
B: Slight leakage
BB: Heavy leakage

Here, a polyurethane was used as a resin material, and the foaming mold used was an automobile seat-like mold. The foaming was carried out under usual foamed polyurethane molding conditions in automobile seats.

Example 1

Production of Reinforcing Layer

A mixture of polyester-based staple fibers was formed into a nonwoven fabric sheet with a pre-needle punching machine, and thus a polyester-based staple fiber nonwoven fabric to serve as a reinforcing layer was obtained. The mixture of polyester-based staple fibers include 30% by mass of the following PET 3, 25% by mass of the following PET 1, and 45% by mass of the following PET 2.

PET 3: sheath-core conjugate fibers including a low-melting-point polyester resin (a PET copolymer) having a melting point of 110° C. and a high-meiting-point polyester resin (a PET homopolymer) having a melting point of 250° C. ("MELTY 4080" manufactured by UNITIKA LTD., average fiber diameter 14 μm, average fiber length 51 mm).

PET 1: single fibers including a high-melting-point polyester resin having a melting point of 250° C. (average fiber diameter 27 μm, average fiber length 64 mm).

PET 2: single fibers including a high-melting-point polyester resin having a melting point of 250° C. (average fiber diameter 14 μm, average fiber length 51 mm).

Production of Dense Layer

A propylene homopolymer having MFR of 60 g/10 min was used, and the propylene homopolymer was melt spun at 230° C. The resultant fibers were deposited on a collecting surface to produce a spunbonded nonwoven fabric layer (S1) (fiber diameter: 15 μm) having a basis weight of 6.0 g/m².

Next, a propylene homopolymer having MFR of 400 g/10 min was molten in an extruder at 280° C., and the molten polymer was extruded from a spinneret while blowing hot air at 280° C. to the fibers at the exit of the orifices. This mehblowing resulted in fibers having a fiber diameter of 3 μm that were deposited on the spunbonded nonwoven fabric (S1). Thus, a meltblown nonwoven fabric layer (M) having a basis weight of 1.0 g/m² was formed. Further, a spunbonded nonwoven fabric (S2) similar to the spunbonded nonwoven fabric (S1) was deposited on the meltbl own nonwoven fabric layer. The three layers were integrated with each other using a hot emboss roll having an embossing area ratio of 18%. Thus, a dense layer composed of the SMS nonwoven fabrics was obtained. The total basis weight of the dense layer was 13 g/m². In Table 1 "PP-SMS" indicates the partially thermocompression-bonded SMS nonwoven fabric. In "providing number", the entirety of a multilayer in which layers are provided in order of SMS is counted as one layer. The "bulk density (per one layer)" in a dense layer indicates the bulk density obtained when the entirety of the muhilayer in which layers are provided in order of SMS is regarded as one layer.

Production of Multilayer Nonwoven Fabric for Foam Molding

The dense layer and the reinforcing layer obtained by the above method were provided to be bonded by needle punching, and, thus, to obtain a multilayer nonwoven fabric for foam molding. The physical properties of the obtained multilayer nonwoven fabric for foam molding were measured by the method described above. The results are shown in Table 1.

Examples 2 to 6

The multilayer nonwoven fabrics for foam molding were obtained similarly to Example 1, except that the basis weight and the fiber diameter of polyester-based staple fiber nonwoven fabric used in the reinforcing layer and the basis weight and the like of the meltblown nonwoven fabric layer and the spunbonded nonwoven fabric layer used in the dense layer were changed as shown in Table 1. The physical properties of the obtained multilayer nonwoven fabrics for foam molding were measured by the method described above. The results are shown in Table 1.

Comparative Examples 1 to 8

The multilayer nonwoven fabrics for foam molding were obtained similarly to Example 1, except that the basis weight and the fiber diameter of polyester-based staple fiber nonwoven fabric used in the reinforcing layer and the basis weight and the like of the meltblown nonwoven fabric layer and the spunbonded nonwoven fabric layer used in the dense layer were changed as shown in Table 1. The dense layer was melted during molding processing, and nonwoven fabrics were formed into films, whereby urethane foam test could not be conducted. The results are shown in Table 1. In Table 1, "–" represents no composition or disposition.

TABLE 1

|  |  |  |  | Example 1 | Example 2 | Example 3 | Example 4 | Example 5 | Example 6 | Comparative Example 1 |
|---|---|---|---|---|---|---|---|---|---|---|
| Reinforcing layer | Staple fiber nonwoven fabric | PET 1 >20 μm staple fiber | Ratio (mass %) | 25 | 25 | 25 | 10 | 10 | 40 | — |
|  |  |  | Fiber diameter (μm) | 27 | 27 | 27 | 39 | 39 | 27 | — |
|  |  | PET 2 ≤20 μm stable fiber | Ratio (mass %) | 45 | 45 | 45 | 60 | 60 | 30 | 70 |
|  |  |  | Fiber diameter (μm) | 14 | 14 | 14 | 14 | 14 | 14 | 14 |
|  |  | PET 3 conjugate staple fiber | Ratio (mass %) | 30 | 30 | 30 | 30 | 30 | 30 | 30 |
|  |  |  | Fiber diameter (μm) | 14 | 14 | 14 | 14 | 14 | 14 | 14 |
|  | Basis weight |  | g/m² | 100 | 100 | 90 | 100 | 80 | 100 | 100 |
| Dense layer | Continuous fiber nonwoven fabric | Layer configuration |  | PP-SMS | PP-SMS | PP-SMS | PP-SMS | PP-SMS | PP-SMS | PP-SMS |
|  | Weight configuration |  | g/m² | 6/1/6 | 7/1/7 | 9/2/9 | 6/1/6 | 6/1/6 | 6/1/6 | 6/1/6 |
|  | Basis weight |  | g/m² | 13 | 15 | 20 | 13 | 13 | 13 | 13 |
|  | Air permeability |  | cm³/cm²/sec | 160 | 120 | 90 | 160 | 160 | 160 | 160 |
|  | Providing number |  | Layer | 1 | 1 | 1 | 1 | 1 | 1 | 1 |
|  | Thickness (per one layer) |  | mm | 0.17 | 0.19 | 0.23 | 0.17 | 0.17 | 0.17 | 0.17 |
|  | Bulk density (per one layer) |  | g/cm³ | 0.08 | 0.08 | 0.09 | 0.08 | 0.08 | 0.08 | 0.08 |
|  | Fiber diameter |  | μm | 15/3/15 | 15/3/15 | 15/3/15 | 15/3/15 | 15/3/15 | 15/3/15 | 15/3/15 |
| Multilayer nonwoven fabric | Basis weight |  | g/m² | 113 | 115 | 110 | 113 | 93 | 113 | 113 |
|  | Thickness |  | mm | 2.6 | 2.5 | 2.4 | 3.2 | 2.6 | 3.4 | 1.5 |

TABLE 1-continued

|  |  |  |  | | | | | | | |
|---|---|---|---|---|---|---|---|---|---|---|
| | Bulk density | | g/cm³ | 0.04 | 0.05 | 0.05 | 0.04 | 0.04 | 0.03 | 0.08 |
| | Tensile strength | MD | N/50 mm | 85 | 90 | 101 | 92 | 87 | 61 | 69 |
| | | CD | N/50 mm | 105 | 110 | 120 | 102 | 96 | 87 | 120 |
| | Elongation | MD | % | 115 | 102 | 98 | 110 | 113 | 103 | 116 |
| | | CD | % | 110 | 98 | 87 | 115 | 108 | 109 | 96 |
| | Air permeability | | cm³/cm²/sec | 150 | 132 | 111 | 151 | 156 | 157 | 124 |
| | Molding properties | | | AA | AA | A | AA | AA | AA | A |
| | Thickness after hot pressing | | mm | 1.5 | 1.4 | 1.3 | 1.6 | 1.4 | 1.6 | 0.8 |
| | Leakage of urethane | | | AA | AA | AA | AA | AA | AA | BB |
| | Comprehensive evaluation | | | AA | AA | A | AA | AA | AA | BB |

| | | | | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Reinforcing layer | Staple fiber nonwoven fabric | PET 1 >20 μm staple fiber | Ratio (mass %) | — | — | 25 | 25 | — | — | 70 |
| | | | Fiber diameter (μm) | — | — | 27 | 27 | — | — | 27 |
| | | PET 2 ≤20 μm stable fiber | Ratio (mass %) | 70 | 50 | 70 | 70 | 100 | PP continuous fiber | — |
| | | | Fiber diameter (μm) | 17 | 17 | 14 | 14 | 14 | 14 | — |
| | | PET 3 conjugate staple fiber | Ratio (mass %) | 30 | 50 | 5 | 5 | — | — | 30 |
| | | | Fiber diameter (μm) | 14 | 14 | 14 | 14 | — | — | 14 |
| | Basis weight | | g/m² | 100 | 100 | 100 | 120 | 100 | 100 | 100 |
| Dense layer | Continuous fiber nonwoven fabric | | Layer configuration | PP-SMS | PP-SMS | PP-SMS | — | PP-SMS | PP-SMS | PP-SMS |
| | Weight configuration | | g/m² | 6/1/6 | 6/1/6 | 6/1/6 | — | 6/1/6 | 6/1/6 | 6/1/6 |
| | Basis weight | | g/m² | 13 | 13 | 13 | — | 13 | 13 | 13 |
| | Air permeability | | cm³/cm²/sec | 160 | 160 | 160 | — | 160 | 160 | 160 |
| | Providing number | | Layer | 1 | 1 | 1 | — | 1 | 1 | 1 |
| | Thickness (per one layer) | | mm | 0.17 | 0.17 | 0.17 | — | 0.17 | 0.17 | 0.17 |
| | Bulk density (per one layer) | | g/cm³ | 0.08 | 0.08 | 0.08 | — | 0.08 | 0.08 | 0.08 |
| | Fiber diameter | | μm | 15/3/15 | 15/3/15 | 15/3/15 | — | 15/3/15 | 15/3/15 | 15/3/15 |
| Multilayer nonwoven fabric | Basis weight | | g/m² | 113 | 113 | 113 | 120 | 113 | 113 | 113 |
| | Thickness | | mm | 2.1 | 2.6 | 2.6 | 2.6 | 1.6 | 1.9 | 3.7 |
| | Bulk density | | g/cm³ | 0.05 | 0.06 | 0.04 | 0.05 | 0.07 | 0.06 | 0.03 |
| | Tensile strength | MD | N/50 mm | 76 | 70 | 80 | 45 | 75 | 176 | 75 |
| | | CD | N/50 mm | 102 | 110 | 101 | 51 | 115 | 153 | 115 |
| | Elongation | MD | % | 111 | 112 | 110 | 101 | 101 | 99 | 101 |
| | | CD | % | 105 | 101 | 106 | 112 | 98 | 111 | 98 |
| | Air permeability | | cm³/cm²/sec | 150 | 125 | 131 | 210 | 95 | 86 | 157 |
| | Molding properties | | | A | A | BB | B | BB | BB | B |
| | Thickness after hot pressing | | mm | 1.1 | 0.9 | 1.6 | 1.7 | 1.3 | 1.6 | 1.8 |
| | Leakage of urethane | | | B | BB | AA | BB | AA | BB | A |
| | Comprehensive evaluation | | | B | BB | BB | BB | BB | BB | B |

The entire disclosure of Japanese Patent Application No. 2013-185735 is incorporated by reference in this specification.

All contents of the documents, patent applications, and technical standards described in this specification are incorporated herein by reference to the same extent as that when it is specifically and individually described that the respective documents, patent applications, and the technical standards are incorporated herein by reference.

The invention claimed is:

1. A multilayer nonwoven fabric for foam molding, comprising:
   a dense layer; and
   a reinforcing layer provided on at least one side of the dense layer, wherein the reinforcing layer is a staple fiber nonwoven fabric containing:
   thermoplastic resin staple fibers (A) having a fiber diameter of more than 20 μm, in an amount of 5% by mass to 50% by mass, and
   thermoplastic resin staple fibers (B) having a fiber diameter of 20 μm or less, in an amount of 95% by mass to 50% by mass,
   wherein a total of the thermoplastic resin staple fibers (A) and the thermoplastic resin staple fibers (B) is 100% by mass, the thermoplastic resin staple fibers (A) or the thermoplastic resin staple fibers (B) contain conjugate polyester-based staple fibers (C) formed containing two or more resins having different melting points, and the conjugate polyester-based staple fibers (C) are contained in the reinforcing layer in an amount of 10% by mass to 40% by mass,
   wherein the dense layer is a nonwoven fabric having bulk density in a range of from 0.05 g/cm³ to 0.3 g/cm³, and
   wherein the dense layer and the reinforcing layer are entangled with each other by needle punching.

2. The multilayer nonwoven fabric for foam molding according to claim 1, wherein a thickness of the fabric is from 1.6 mm to 5.0 mm.

3. The multilayer nonwoven fabric for foam molding according to claim 1, wherein a thickness of the fabric after being held at 110° C. and 4.9 Pa for 5 minutes is 1.2 mm or more.

4. The multilayer nonwoven fabric for foam molding according to claim 1, wherein a fiber diameter of at least a portion of the conjugate polyester-based staple fibers (C) is 20 μm or less.

5. The multilayer nonwoven fabric for foam molding according to claim 1, wherein a melting point of at least one resin that forms the conjugate polyester-based staple fibers (C) is in a range of from 110° C. to 190° C.

6. The multilayer nonwoven fabric for foam molding according to claim 1, wherein the dense layer includes a nonwoven fabric that is partially thermocompression-bonded, air through processed, resin bonded, or calendered.

7. The multilayer nonwoven fabric for foam molding according to claim 1, wherein the dense layer is a nonwoven fabric constituted of continuous fibers.

8. The multilayer nonwoven fabric for foam molding according to claim 1, wherein the thermoplastic resin staple fibers (A) and the thermoplastic resin staple fibers (B) are at least one kind of staple fibers selected from the group consisting of polyester-based staple fibers and polyolefin-based staple fibers.

9. The multilayer nonwoven fabric for foam molding according to claim 1, wherein the thermoplastic resin staple fibers (A) and the thermoplastic resin staple fibers (B) are polyester-based staple fibers.

10. The multilayer nonwoven fabric for foam molding according to claim 1, wherein the dense layer includes a continuous fiber nonwoven fabric that is partially thermo-compression-bonded.

11. The multilayer nonwoven fabric for foam molding according to claim 1, wherein a basis weight of the dense layer is in a range of from 10 g/m² to 35 g/m².

12. The multilayer nonwoven fabric for foam molding according to claim 1, wherein an air permeability of the dense layer is in a range of from 70 cm³/cm²/sec to 200 cm³/cm²/sec.

13. The multilayer nonwoven fabric for foam molding according to claim 1, wherein the dense layer comprises a multilayer structure containing:
a melt-blown nonwoven fabric layer (M) that is constituted of continuous fibers, and
a spunbonded nonwoven fabric layer (S) constituted of continuous fibers, and provided on both sides of the melt-blown nonwoven fabric layer (M); and
the melt-blown nonwoven fabric layer (M) and each spunbonded nonwoven fabric layer (S) are partially thermocompression-bonded with each other.

14. The multilayer nonwoven fabric for foam molding according to claim 1, wherein the multilayer nonwoven fabric has an air permeability at a pressure difference of 125 Pa of from 25 cm³/cm²/sec to 160 cm³/cm²/sec.

15. The multilayer nonwoven fabric for foam molding according to claim 1, wherein the multilayer nonwoven fabric has a basis weight of from 20 g/m² to 160 g/m².

16. The multilayer nonwoven fabric for foam molding according to claim 1, wherein the multilayer nonwoven fabric has an air permeability at a pressure difference of 125 Pa of 25 cm³/cm²/sec to 140 cm³/cm²/sec.

17. The multilayer nonwoven fabric for foam molding according to claim 1, wherein a basis weight of the reinforcing layer is in a range of from 40 g/m² to 150 g/m².

18. A method of producing the multilayer nonwoven fabric for foam molding according to claim 1, comprising providing the reinforcing layer on at least one side of the dense layer, and, subsequently, entangling the reinforcing layer and the dense layer with each other by needle punching.

19. The method of producing the multilayer nonwoven fabric for foam molding according to claim 18, wherein the dense layer is formed by providing the spunbonded nonwoven fabric layer (S) on both sides of the meltblown nonwoven fabric layer (M), and, subsequently, carrying out partial thermocompression-bonding, air through processing, resin bonding, or calendering.

20. A urethane-foam molded complex in which a urethane foam layer is provided on an outer surface of the reinforcing layer of the multilayer nonwoven fabric for foam molding according to claim 1.

21. The urethane-foam molded complex according to claim 20, wherein the reinforcing layer and the urethane foam layer are integrated with each other.

22. A vehicle seat comprising the multilayer nonwoven fabric for foam molding according to claim 1.

23. A chair comprising the multilayer nonwoven fabric for foam molding according to claim 1.

24. A vehicle seat comprising the urethane-foam molded complex according to claim 20.

25. A chair comprising the urethane-foam molded complex according to claim 20.

* * * * *